United States Patent
Lee

(10) Patent No.: US 9,428,122 B2
(45) Date of Patent: Aug. 30, 2016

(54) ACTIVE CONTROL SYSTEM FOR LOW DC/DC CONVERTER IN AN ELECTRIC VEHICLE

(71) Applicants: Hyundai Motor Company, Seoul (KR); Kia Motors Corporation, Seoul (KR)

(72) Inventor: Minwoo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 302 days.

(21) Appl. No.: 13/681,838

(22) Filed: Nov. 20, 2012

(65) Prior Publication Data

US 2014/0028087 A1    Jan. 30, 2014

(30) Foreign Application Priority Data

Jul. 30, 2012   (KR) .................. 10-2012-0083534

(51) Int. Cl.
| | |
|---|---|
| B60L 1/10 | (2006.01) |
| B60L 3/00 | (2006.01) |
| H02G 3/00 | (2006.01) |
| B60R 16/02 | (2006.01) |
| B60R 16/033 | (2006.01) |
| B60L 11/18 | (2006.01) |
| B60L 15/20 | (2006.01) |

(52) U.S. Cl.
CPC ............ *B60R 16/02* (2013.01); *B60L 11/1868* (2013.01); *B60L 15/2045* (2013.01); *B60R 16/033* (2013.01); *Y02T 10/645* (2013.01); *Y02T 10/7005* (2013.01); *Y02T 10/7066* (2013.01); *Y02T 10/7283* (2013.01)

(58) Field of Classification Search
USPC .............................................. 307/9.1; 702/22
See application file for complete search history.

(56) References Cited

U.S. PATENT DOCUMENTS

2011/0025127 A1*   2/2011   Choi ................... B60K 6/48
                                                       307/10.1

FOREIGN PATENT DOCUMENTS

| | | | |
|---|---|---|---|
| JP | H07-107621 | A | 4/1995 |
| JP | 2003-037903 | A | 2/2003 |
| JP | 2010136495 | A * | 6/2010 |
| JP | 2010226776 | A | 10/2010 |
| JP | 2011-031870 | A | 2/2011 |
| JP | 2011116330 | A * | 6/2011 |
| KR | 10-2005-0035343 | A | 4/2005 |
| KR | 10-0867795 | B1 | 11/2008 |
| KR | 10-2009-0059175 | | 6/2009 |
| KR | 10-2009-0104171 | | 10/2009 |
| KR | 10-2010-0031964 | | 3/2010 |
| KR | 10-2011-0012214 | | 2/2011 |
| KR | 10-1028020 | B1 | 4/2011 |
| KR | 10-2011-0054982 | | 5/2011 |

* cited by examiner

*Primary Examiner* — Rexford Barnie
*Assistant Examiner* — Xuan Ly
(74) *Attorney, Agent, or Firm* — Mintz Levin Cohn Ferris Glovsky and Popeo, P.C.; Peter F. Corless

(57) ABSTRACT

An active control system for a LDC (Low-voltage DC/DC Converter) in a vehicle is disclosed. The LDC is disposed between a high voltage battery and a low voltage battery, rectifies the voltage in two directions and a VCU (Vehicle Control Unit) configured to control the LDC. The VCU is configured to control when a DC active control mode is initiated to obtain the minimum charging time of the low voltage battery.

5 Claims, 6 Drawing Sheets

FIG.4A

| Classification | Condition | LDC Output Voltage [V] | Voltage Table | Remarks |
|---|---|---|---|---|
| Driving | Deceleration (Regenerative Braking) | 13.6V | Voltage B Table | |
| | P-shift Stage Stop | | | |
| | Stop except for P-shift stage | 13.2V | Voltage C Table | |
| | Fixed Speed | | | |
| | Acceleration | 14.3V | Voltage A Table | |
| | H/Lamp | | | |
| | Wiper | | | |
| | Blower Max | | | |
| Lack of Charging Time (Forced Charging) | | 13.6V | Voltage B Table | |

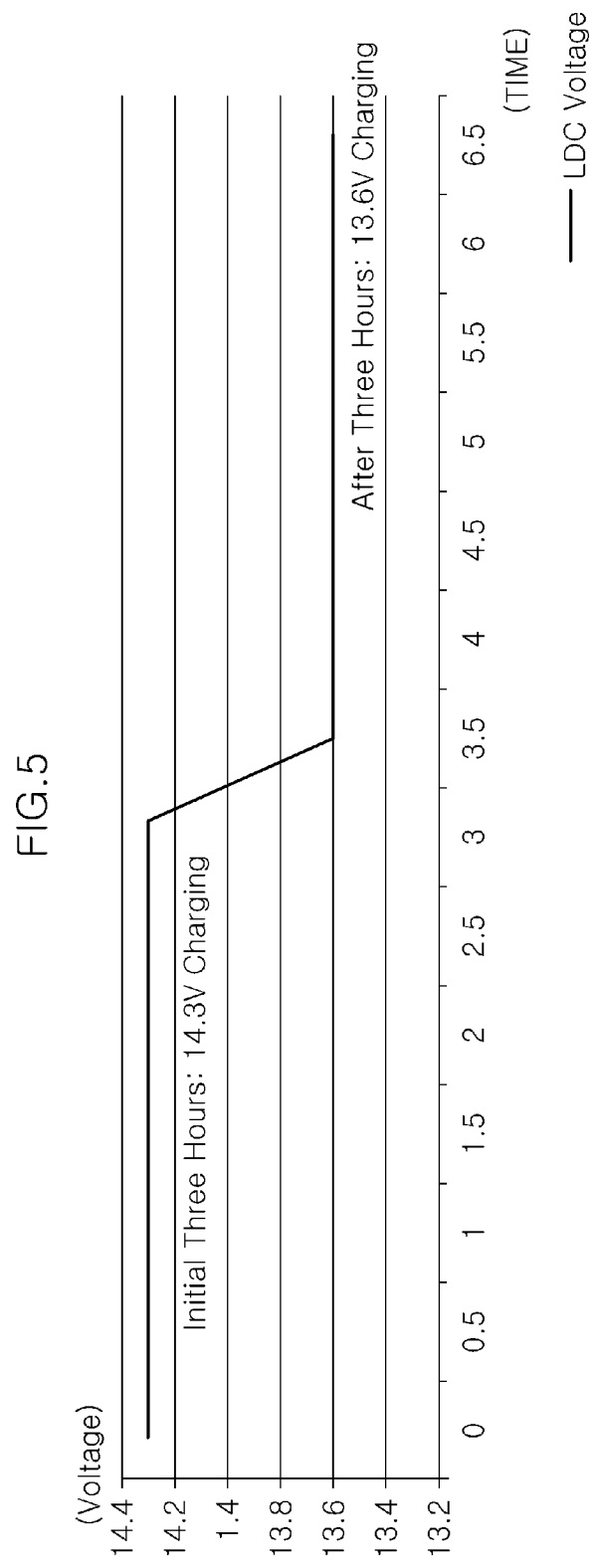

ACTIVE CONTROL SYSTEM FOR LOW DC/DC CONVERTER IN AN ELECTRIC VEHICLE

CROSS-REFERENCE(S) TO RELATED APPLICATIONS

This application claims priority to Korean Patent Application No. 10-2012-0083534, filed on Jul. 30, 2012, which is incorporated herein by reference in its entirety.

BACKGROUND OF THE INVENTION

1. Field of the Invention

The present invention relates to an active control system for a LDC (Low-voltage DC/DC Converter) in an electric vehicle, and particularly to a LDC control for an electric vehicle which makes it possible to increase the miles traveled per charge in an electric vehicle and to increase the lifespan of a low voltage battery with the aid of a LDC voltage technique without the use of a battery sensor.

2. Description of Related Art

A hybrid vehicle is a vehicle that uses two or more distinct power sources to move the vehicle. The term "hybrid vehicle" often refers to hybrid electric vehicles (HEVs), which combine an internal combustion engine and one or more electric motors. However, other types of hybrids such as fuel cell electric hybrid vehicles are also encompassed by this category of vehicle. In the past decade, hybrid vehicles have become popular due to their increased fuel efficiency. Hybrid vehicles are able to increase fuel efficiency by providing a driving force to the drive train via an electric motor during (in the case of parallel hybrid vehicles) starting or accelerating and charging the battery during braking.

Typically, a high level controller (i.e., composed of a processor and a memory) is configured to control the entire operation of an electric vehicle. This high level controller is often referred to as an HCU (Hybrid Control Unit) or a VCU (Vehicle Control Unit). The HCU or the VCU is configured to communicate with a MCU (Motor Control Unit) which is a low level controller to thereby control the torque, speed and electric power torque output of the electric motor which is providing all or a portion of the driving force source. The HCU is further configured to communicate with an ECU (Engine Control Unit) which controls the engine. The engine in a hybrid vehicle generates a driving force which is applied to the drive train (i.e., the transmission) as well as a voltage which is applied to the battery to maintain the battery at a certain state of charge (SOC). To do so, the ECU performs relay control in relation with a driving force and an error diagnosis.

In addition, the HCU communicates with a BMS (Battery Management System) which is configured to detect the temperature, voltage, current and SOC (State Of Charge) of a battery and to manage the entire operational state of the battery, thus controlling the motor torque and speed depending on the state of the SOC and to further communicate with a TCU (Transmission Control Unit). The TCU determines and controls a speed change ratio depending on the speed of a vehicle and a driving demand from a driver, thus controlling and maintaining the speed of the vehicle required by the driver.

The communications between the HCU, a high level controller, and any of the low level controllers is often conducted via a CAN communication, so the information is exchanged between each of these controllers and a control signal is received and transmitted therebetween.

All vehicles which an electric motor are often equipped with an LDC (Low-voltage DC/DC converter) configured to reduce the high voltage coming from the high voltage battery into a low voltage direct current DC. The LDC is an electronic circuit which converts a source voltage from the high voltage battery of the vehicle which outputs a direct current (DC) from one voltage level to another for a plurality of different load requirements. In particular, the LDC is required to power accessories and the HVAC system.

Generally, the LDC is able to generate the maximum output irrespective of an alternator of an internal combustion engine and the vehicle RPM and operates with a 12V battery under all the conditions such as a driving, a stop, etc. During a high voltage battery charging procedure in an electric vehicle, since the low voltage battery is always being charged, the low voltage battery is often continuously over charged.

Furthermore, since the LDC output voltage is outputted at a set voltage of 14.3V, electric power is unnecessarily consumed due to the continuous LDC high voltage output (namely, 14.3V). Therefore, as a result the number of miles that the vehicle can travel per charge decreases. In addition, since the low voltage battery is continuously being charged, the lifespan of the battery decreases as a result of over charging and a gas generation phenomenon (gassing). This phenomenon occurs when excessive charging electrolyzes some of the water in the battery, emitting hydrogen and oxygen therein.

SUMMARY OF THE INVENTION

Accordingly, the present invention provides an LDC active control system in an electric vehicle increases the number of miles per charge an electric vehicle can travel by utilizing a LDC voltage control technology rather than a battery sensor (i.e., without the use of a battery sensor). In addition, it is another object of the present invention to provide an LDC active control system which can prevent an over-charging of a low voltage battery and a gas generation in the middle of charging an electric vehicle.

The present invention is directed to providing an active control system for a LDC in an electric vehicle which makes it possible to increase a mileage of an electric vehicle and to elongate a service life of a battery by way of an obtained low voltage battery charging time, an active control when obtaining a charging time and an over current charging limiting logic.

To achieve the above objects, there is provided an active control system for a LDC (Low-voltage DC/DC Converter) in an electric vehicle, comprising a LDC which is disposed between a high voltage battery and a low voltage battery and drops and boosts the voltage in two directions and a VCU (Vehicle Control Unit) configured to control the LDC, wherein the VCU configured to control the LDC for a DC active control mode not to start for the purpose of obtaining the minimum charging time of the low voltage battery if the full speed charging time is lower than a first full speed charging reference time, and to control the LDC in accordance with the LDC active control mode as the LDC active control mode starts if the full speed charging time is higher than the first full speed charging reference time. Here, the LDC active mode is configured to charge the low voltage battery with the LDC output voltage in the voltage table based on the driving information.

The driving information may be embodied as one or combination of deceleration, a P-shift stage stop, a fixed speed, acceleration and/or an on/off state of a high electric field load. Likewise, the voltage table may be embodied as one or combination of a voltage A table, a voltage B table and a voltage C table.

In some exemplary embodiments, the VCU may be configured to lower and output the LDC output voltage after the low voltage battery has been charge initially for a certain period of time. When the LDC active control mode does not start, the LDC divides into a high electric field load use state and a high electric field load non-use state and outputs different LDC output voltages. When, however, the low voltage battery is charged with a high current, the VCU compares the high electric field load with the LDC output current and controls the LDC output voltage, thus adjusting the LDC output current.

Advantageously, it is possible to increase of the number of miles an electric vehicle can travel on a single charge by utilizing a low voltage battery charging time obtaining logic, (i.e., an active control when obtaining a charging time and/or a limited over current charging logic). In addition, the present invention increases the lifespan of a battery by prevent over-charging of a low voltage battery and gas generation within the battery due to excessive charging.

BRIEF DESCRIPTION OF THE DRAWINGS

FIG. 4A is a table illustrating the LDC active control according to an exemplary embodiment of the present invention.

FIG. 5 is a graph illustrating an over charge protection logic when charging a high voltage battery according to an exemplary embodiment of the present invention.

DESCRIPTION OF SPECIFIC EMBODIMENTS

Figure 1:
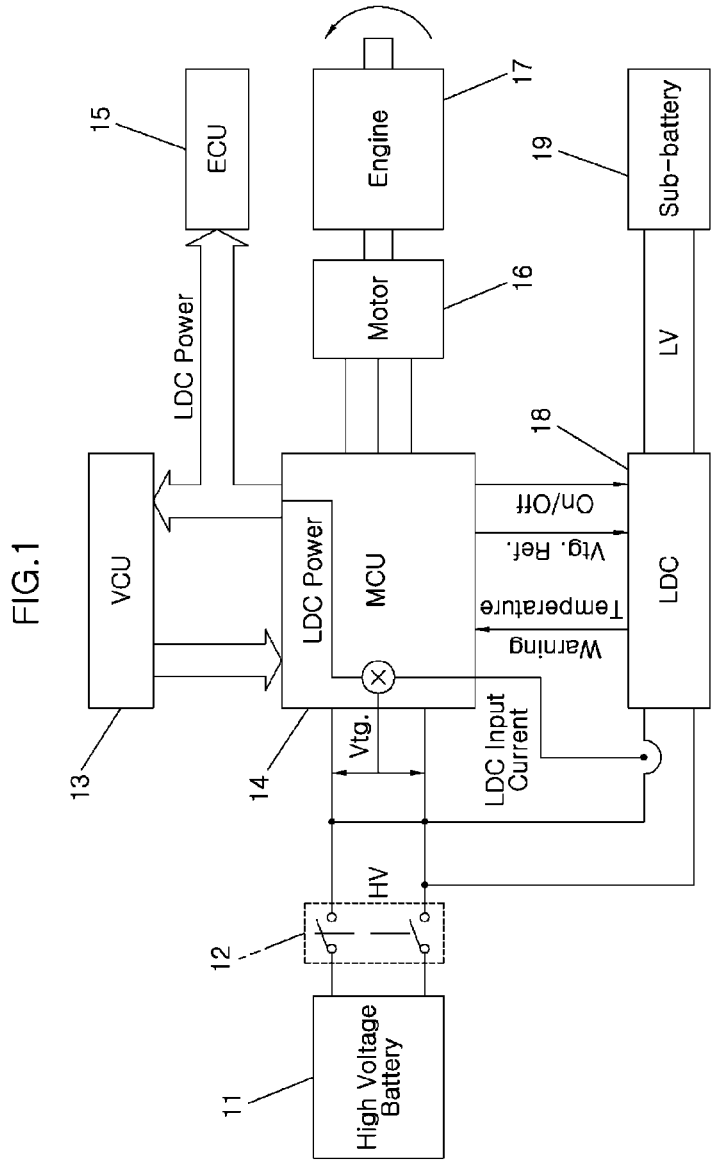
FIG. 1 is a circuit block diagram illustrating a LDC (Low Voltage DC-DC Converter) active control system for an electric vehicle according to an exemplary embodiment of the present invention.

The present invention may be modified in various forms and may have different embodiments, although specific embodiments will be described with reference to the accompanying drawings. However, the specific embodiments are not limited thereto, and they are preferably understood as including all modification, equivalents or alternatives which all belong to the concept and technical range of the present invention.

When describing each drawing, the similar reference numerals are assigned to the similar elements. The terms such as first, second, etc. might be used to indicate various different elements; however such elements are not limited by the terms. The above mentioned terms are used for the purpose of distinguishing one element from another element. For example, the first elements might be named as a second element as long as it belongs to the scope of the right of the present invention, and in similar ways, the second element might be named as a first element, and the term "and/or" means a combination of a plurality of elements or one specific element among a plurality of related elements.

It is obvious that an ordinary person skilled in the art is well aware of the meanings of all the terms used in the present specification including technical and scientific terms as long as they are not specifically defined as other elements. The terms defined in well-known dictionaries should be interpreted as having the same meanings of the related arts in view of their contexts, and they should not be interpreted as having too ideal or typical meanings unless their meanings are specifically defined in the present specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller or control unit refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The active control system for an LDC in an electric vehicle according to an exemplary embodiment of the present invention will now be described keeping in mind the above.

FIG. 1 is a circuit block diagram illustrating an active control system for an LDC in an electric vehicle according to the exemplary embodiment of the present invention. Referring to FIG. 1, the electric vehicle includes a high voltage battery 11, a main relay 12, a VCU (Vehicle Control Unit) 13 which is a high level controller, a MCU (Motor Control Unit) 14 which is a low level controller, an ECU (Engine Control Unit) 15, a motor 16, an engine 17, a LDC (Low DC/DC converter) 18 and a low voltage battery 19.

The VCU 13 is configured to control the entire operation of the electric vehicle. The VCU 13 communicates with a MCU 14, which is a low level controller, by way of a certain specific communication method (e.g., over a CAN) while controlling the torque and speed and electric power generation torque output of the motor 16 and communicates with an ECU 17 which controls the engine 17 The engine in a hybrid vehicle generates a driving force which is applied to the drive train (i.e., the transmission) as well as a voltage which is applied to the battery to maintain the battery at a certain state of charge (SOC). To do so, the ECU performs relay control in relation with a driving force and an error diagnosis.

The VCU 13 is configured to detect the temperature, voltage, and the current SOC (State Of Charge) of the high voltage battery 11. As mentioned above, the high voltage battery 11 is the main power source for the motor 16. The VCU also communicates with a BMS (Battery Management System) (not shown) which manages and monitors the state of the high voltage battery 11. Therefore, the BMS controls the torque and speed of the motor depending on the state of the SOC and communicates with a TCU (Transmission Control Unit (not shown) which determines and controls the speed change ratio depending on the speed of the vehicle and a power request from a driver, thus maintaining the speed of the vehicle based on the driver's demand.

In addition, the VCU 13 performs LDC active control and/or over current charging limiting logic when the low voltage battery charging time is obtained and the charging time is obtained. More specifically, the VCU 13 collects the driving information which may include any one or more of a deceleration, a P-shift stage stop, a fixed speed, an acceleration and/or an on/off state of a high electric field load. The VCU 13 may also be configured to control the LDC for to provide LCD active control based on the above mentioned driving information. In other words, the VCU monitors and makes determinations based on an APS (Accelerator Position Sensor), an open angle, a gear state, etc. The communications between the VCU 13 and the MCU 14 and the ECU which are low level controllers maybe conducted via a controller area network (CAN) communication to exchange information by transmitting and receiving control signals therebetween over the CAN.

As stated above, the electric vehicle is equipped with a LDC 18 for the purpose of rectifying power output from the high voltage battery 11 of a high voltage and converting the power into direct current. The LDC 18 serves to switch an ordinary direct current and convert it into AC and to reduce the output voltage using a coil, a transformer, a capacitance, etc. and then to rectify once again the current to direct current, thus supplying electric power depending on the voltage which is used in each electric field load individually. The electric field load may be, for example, a head lamp, a wiper motor, a blower, etc. as a high electric field load.

Figure 2:
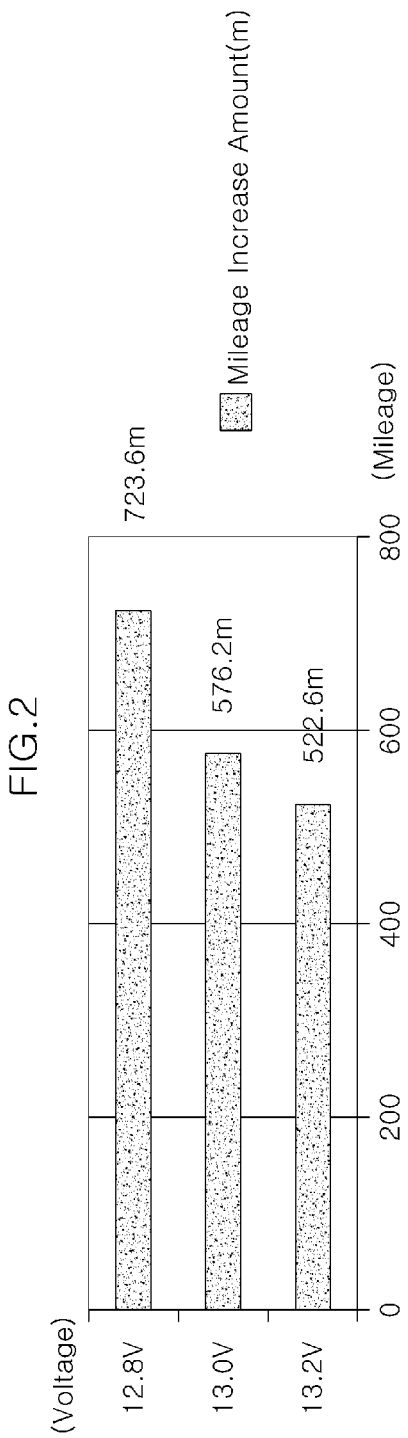
FIG. 2 is a graph illustrating a resulting increased mileage per charge in an electric vehicle with the aid of a LDC voltage in the exemplary embodiment of the present invention.

FIG. 2 is a graph illustrating increased mileage per charge in an electric vehicle based on the LDC voltage. As shown therein, the number of miles that the electric vehicle can drive per charge depending on the LDC voltage can be determined by the resulting graphical representation in FIG. 2. As can be seen from the graph, as the LDC voltage increases, the mileage decreases.

Figure 3:
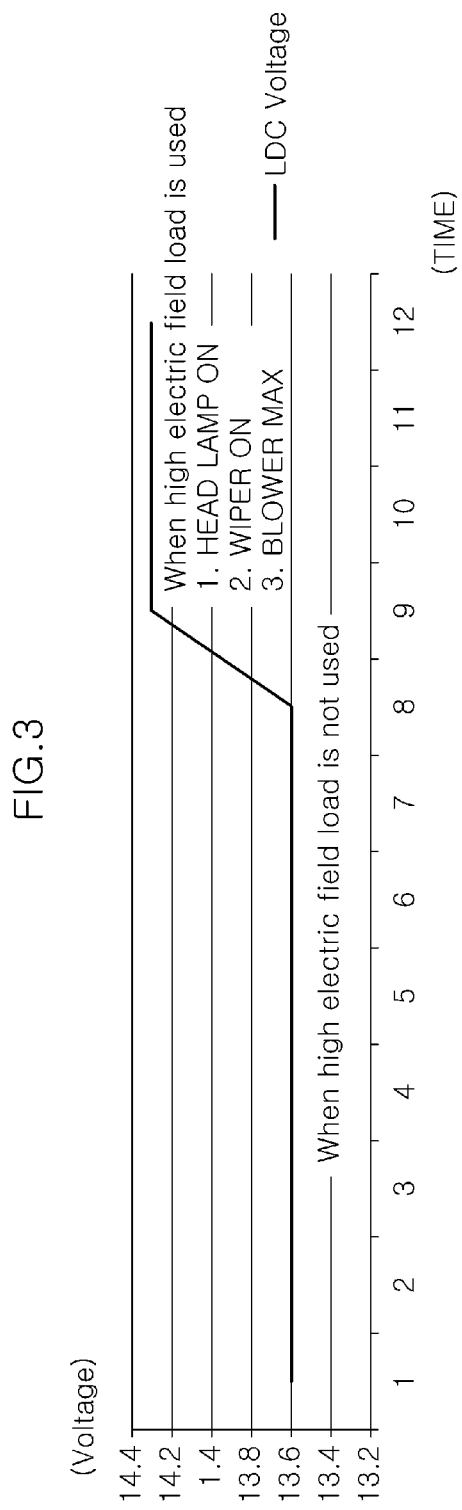
FIG. 3 is a graph illustrating a lowest charging time obtaining logic in a low voltage battery according to an exemplary embodiment of the present invention.

FIG. 3 is a graph illustrating the minimum charging time obtaining logic of the low voltage battery according to the exemplary embodiment of the present invention. As shown in FIG. 3, the electric vehicle does not start the LDC active control mode unless a reliable battery SOC is obtained. More specifically, the full speed charging time of the electric vehicle may be about 6 hours. Therefore, when the full speed charging time of the electric vehicle is less than 3 hours, the electric vehicle is programmed to execute a certain logic which obtains the minimum charging time of the low voltage battery. In this case, the LDC divides the load into a use state high electric field load and a non-use state high electric field load and outputs differently the LDC output voltage accordingly. As stated above the high electric field load may include a head lamp on, a wiper on and/or a blower max.

FIG. 4A is a table illustrating LDC active control according to the exemplary embodiment of the present invention. Referring to FIG. 4A, once the electric vehicle receives three hours of the full speed charging time, the electric vehicle initiates the LDC active control mode. As shown in FIG. 4A, the low voltage battery (19 of FIG. 1) is charged with the LDC output voltage as shown in the voltage table based on driving information. Here, the driving information refers to a deceleration, a P-shift stage stop, a fixed speed, an acceleration and an on/off state of a high electric field load.

Figure 4B:
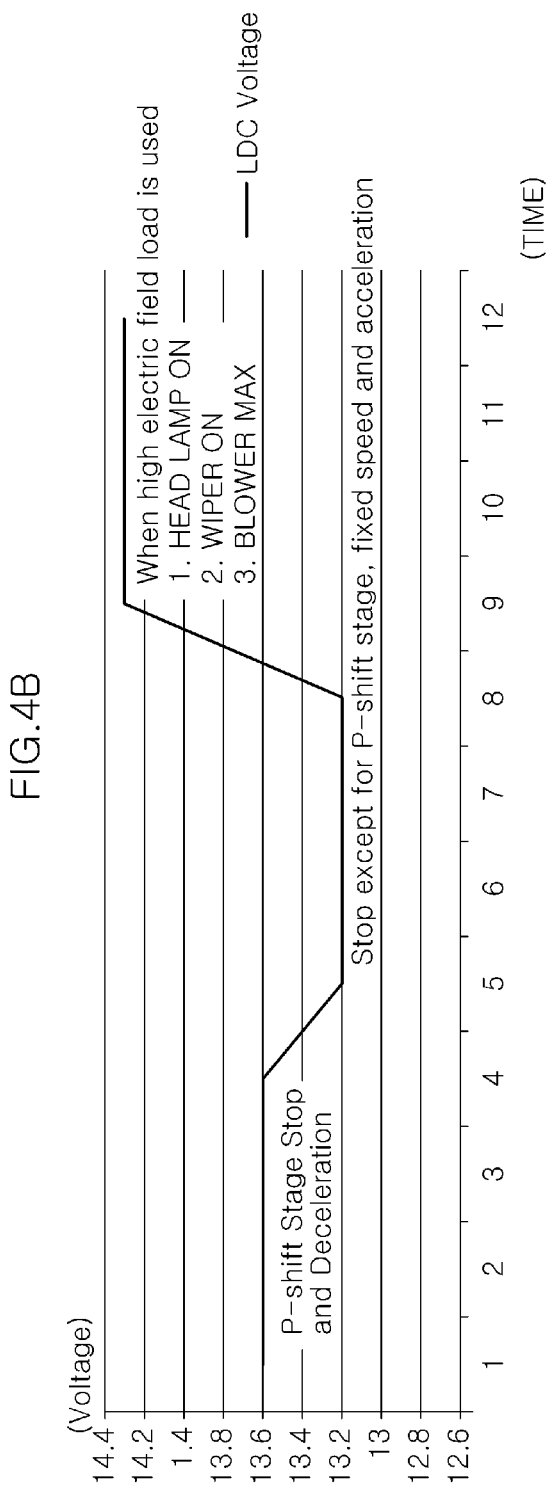
FIG. 4B is a graph illustrating the LDC active control of FIG. 4A.

The voltage table is formed of a voltage A table of 14.3V, a voltage B table of 13.6V and a voltage C table of 13.2V. The above mentioned voltage table is a lookup table and is previously programmed and stored in the VCU's memory (13 of FIG. 1). In addition, when the charging time is insufficient, forced charging is performed depending on the LDC active control mode. In this case, the LDC output voltage is 13.6V, and the voltage B table is utilized by the LDC. FIG. 4B is a graph illustrating the LDC active control of FIG. 4A.

FIG. 5 is a graph illustrating an over charge protection logic of a low voltage battery applied when charging the high voltage battery according to the exemplary embodiment of the present invention. Referring to FIG. 5, the LDC lowers and outputs the LDC output voltage after an initial charging time (about 3 hours) of the low voltage battery 19. In FIG. 5, a logic which is programmed to prevent overcharging of the low voltage battery (19 of FIG. 1) while charging the high voltage battery (11 of FIG. 1). In more details, when the high voltage battery 11 is charged, the low voltage battery 19 is charged at the same time. When the electric vehicle is charged, the LDC output voltage is lowered after three hours, so the over charge of the low voltage battery and the gas generation phenomenon (gassing) can be prevented. For the initial three hours, the LDC output voltage is 14.3V, and the low voltage battery 19 is charged with 14.3V. After the initial three hours, the LDC output voltage is 13.6V, and the low voltage battery 19 is charged with 13.6V.

In addition, the over current charging is limited according to the exemplary embodiment of the present invention. The VCU 13 serves to compare the high electric field load with the LDC output current when the low voltage batter is charged with a high level current and then controls the LDC output voltage, thus adjusting the LDC output current. So, the battery over current charging can be prevented, and the number of miles which the vehicle can travel per charge is increased.

For the sake of a better understanding of the present invention, the VCU was provided as an example. However, the present invention can be applied to the HCU (Hybrid Control Unit) of the hybrid vehicle in more specific scenarios without departing from the illustrative embodiment of the present invention.

What is claimed is:

1. An active control system for a LDC (Low-voltage DC/DC Converter) in a vehicle, comprising:
    a low voltage battery;
    a high voltage battery;
    a LDC disposed between the high voltage battery and the low voltage battery and configured to increase and decrease a voltage applied thereto in two different directions including a full speed charging mode and a LDC active control mode; and
    a VCU (Vehicle Control Unit) configured to control the LDC, wherein the VCU monitors a charging time of the low voltage battery, and waits to initiate the LDC active control mode until the low voltage battery has been charging longer than a first reference time of the full speed charging mode unless a reliable battery SOC (state of charge) of the low voltage battery is obtained, wherein the VCU is configured to decrease an output of the LDC output voltage after an initial charging time of the low voltage battery for an over charge protection of the low voltage battery applied when charging the high voltage battery, and wherein the low voltage battery is charged with the LDC output voltage based on a voltage table related to driving information and the voltage table is previously programmed by a non-transitory computer readable medium and stored in a memory of the VCU.

2. The system of claim 1, wherein the LDC active mode is configured to charge the low voltage battery with the LDC output voltage obtained from the voltage table based on one or more pieces of driving information.

3. The system of claim 2, wherein the driving information selected from one or more of group consisting of a deceleration, a P-shift stage stop, a fixed speed, an acceleration and an on/off state of a high electric field load, and the voltage table is selected from a group consisting of a voltage A table, a voltage B table and a voltage C table.

4. The system of claim 1, wherein before the LDC active control mode initiates, the LDC divides into a high electric field load use state and a high electric field load non-use state and outputs different LDC output voltages.

5. The system of claim 1, wherein when the low voltage battery is charged with a high current, the VCU compares the high electric field load with the LDC output current and controls the LDC output voltage, thus adjusting the LDC output current.

* * * * *